(12) United States Patent
McCann et al.

(10) Patent No.: US 7,020,669 B2
(45) Date of Patent: Mar. 28, 2006

(54) APPARATUS, METHOD AND SYSTEM FOR WRITING DATA TO NETWORK ACCESSIBLE FILE SYSTEM WHILE MINIMIZING RISK OF CACHE DATA LOSS/DATA CORRUPTION

(75) Inventors: Peter John McCann, Mason, NH (US); Brian James Martin, Redmond, WA (US); Roy Clark, Hopkinton, MA (US)

(73) Assignee: EMC Corporation, Hopkinton, MA (US)

( * ) Notice: Subject to any disclaimer, the term of this patent is extended or adjusted under 35 U.S.C. 154(b) by 369 days.

(21) Appl. No.: 09/965,393

(22) Filed: Sep. 27, 2001

(65) Prior Publication Data

US 2003/0061240 A1 Mar. 27, 2003

(51) Int. Cl.
*G06F 12/00* (2006.01)
*G06F 17/30* (2006.01)

(52) U.S. Cl. .................. 707/206; 707/204; 707/202; 707/203

(58) Field of Classification Search ................ 707/200, 707/202, 205, 1, 206, 204, 203
See application file for complete search history.

(56) References Cited

U.S. PATENT DOCUMENTS

| | | | | |
|---|---|---|---|---|
| 5,546,558 | A | * | 8/1996 | Jacobson et al. ........... 711/114 |
| 5,790,773 | A | * | 8/1998 | DeKoning et al. ............. 714/6 |
| 5,832,522 | A | * | 11/1998 | Blickenstaff et al. ....... 707/204 |
| 6,397,348 | B1 | * | 5/2002 | Styczinski ..................... 714/6 |
| 6,675,180 | B1 | * | 1/2004 | Yamashita ................. 707/204 |
| 6,823,336 | B1 | * | 11/2004 | Srinivasan et al. ............ 707/8 |

OTHER PUBLICATIONS

VERITAS Volume Replication and Oracle Databases, a Solution White Paper, by Paul Massiglia, VERITAS™ Software Co., May 2000.*
Sun Cluster 3.0 U1 Concepts, Sun Microsystems™, Jul., 2001.*
Sun StorEdge™ Network Data Replicator 3.0 System Administrator Guide, Sun Microsystems™, Jun., 2001.*

* cited by examiner

Primary Examiner—Greta Robinson
Assistant Examiner—Kuen S. Lu
(74) *Attorney, Agent, or Firm*—William J. Daley; George N. Chaclas; Edwards Angell Palmer & Dodge, LLP

(57) ABSTRACT

Featured are methods for writing file systems write data operations to storage medium as well as system and program embodying such a methodology. According to one aspect, the method includes storing a file systems write data operation to a first temporary data store and mirroring the file systems write data operation in a second temporary data store. The method further includes deleting the mirrored file systems write data operation from the second temporary data store if it is successfully written from the first temporary data store to the storage medium and writing the mirrored file systems write data operation from the second temporary data store to the storage medium if it is not successfully written from the first temporary data store. In another aspect, the method includes storing the file systems write data operation in the first temporary data store of one server and mirroring it in the second temporary data store of another server. The method further includes monitoring the operational status of each server and writing the mirrored file systems write data operation from the second temporary data store of the other server to the storage medium when it is determined that one of the servers is not operational.

42 Claims, 4 Drawing Sheets

APPARATUS, METHOD AND SYSTEM FOR WRITING DATA TO NETWORK ACCESSIBLE FILE SYSTEM WHILE MINIMIZING RISK OF CACHE DATA LOSS/ DATA CORRUPTION

FIELD OF INVENTION

The present invention relates to a computer system, methods and operating systems for writing data to a network accessible file system and more particularly to systems, apparatuses and methods for such data writing in a clustered server environment while minimizing risk of data loss/corruption upon failure of a cluster server node.

BACKGROUND OF THE INVENTION

There have been a number of efforts undertaken in a network environment to provide high availability to network-accessible filesystems. Such efforts have included providing a high availability storage medium(s) (e.g., RAID disc arrays) and cluster servers that can access such a high availability storage medium(s). The high availability storage medium(s) also is further configured so as to implement any of a number of storage schemes such as mirroring data on a duplicate disk (RAID level 1) or providing a mechanism by which data on one disk, which disk has become lost or inaccessible, can be reconstructed from the other disks comprising the storage medium (RAID level 5).

As shown in FIG. 1, clustered servers are generally configured and arranged so that there are redundant nodes for accessing the storage medium, for example two (2) nodes, Nodes A, B. Conceptually this feature improves data and application availability by allowing two servers or the two nodes to trade ownership of the same hard disks or RAID disk array within a cluster. When one of the servers in the cluster is unavailable (e.g., the operating system on the server fails), the operating system cluster software, such as Microsoft Cluster Server (MSCS) available with Microsoft Windows NT or Windows 2000 server, of the other still functioning node or server automatically recovers the resources and transfers the work from the failed system or server to the other operational server within the cluster. The redundant servers and operating systems thus provide a mechanism by which the client applications can quickly reconnect to the external hard disks or RAID disk array so that they can access their data and/or applications programs stored therein. As a result, the failure of one server or operating system in the cluster does not affect the other server (s) or system(s), and in many cases, the client applications as well as the remote user are completely unaware of the failure. This redundancy and automatic recovery capability in turn relates to higher server availability for users.

In addition, a past major concern with input/output (I/O) operations was the speed at which operations were being processed because most users where concerned about getting their work done as fast as possible. Thus, efforts where undertaken to improve the relative speed of I/O operations for example by the use of a cache operably located between the random access memory (RAM) or client applications and the storage medium (e.g., hard disk or disk array). Because the data can be written to the cache relatively faster than if there was a direct write-through to the storage medium and because writes from the cache to the storage medium are done typically in batch or flushing style, the apparent speed of the I/O operation(s) is improved.

In addition to I/O processing speed, the reliability of the data being stored has become an increasingly important issue relative to the speed by which a user can access data on the disk drive. Stated another way, if there is a system failure resulting in data loss or data corruption the speed by which the preceding I/O operation was performed becomes irrelevant. Two write systems, the careful write file system and the lazy write file system, do not guarantee protection of user file data. If the operating system crashes while an application is writing a file using either of these two systems, the file can be lost or corrupted. In the case of a lazy write file systems the crash also can corrupt the lazy write file system, destroying existing files or even rendering an entire volume inaccessible.

Some operating systems have been developed to include a write functionality or technique whereby no file system operations or transactions will be left incomplete and the structure of the disk volume will remain intact in the case of system failure without the need to run a disk repair utility. Such a recovery functionality, however, does not result in the recovery of and updating of user data. Rather, the recovery procedure returns the data file to a consistent state existing before the write, however in process changes written to the cache can be lost.

It thus would be desirable to provide a new operating system, computer system and methods related thereto, operating in a cluster server environment, that can recover from the failure of one cluster node or cluster server which recovery also includes the capability of updating the data file in a storage medium to include data that was not completely written (i.e., unwritten data) before the onset of the failure. It also would be particularly desirable to provide such an operating system, computer system, executable program and methods related thereto where such recovery is accomplished automatically or without user action. It also would be desirable to provide such an operating system, computer system, executable program and methods related thereto where such recovery can be effected seamlessly to the remote user and essentially without or with minimal interruption to a running or client application. Such systems preferably would be simple in construction and such methods would not require highly skilled users to utilize the systems as compared to prior art systems or methodologies.

DEFINITIONS

The instant invention is most clearly understood with reference to the following definitions:

A computer readable medium shall be understood to mean any article of manufacture that contains data that can be read by a computer or a carrier wave signal carrying data that can be read by a computer. Such computer readable media includes but is not limited to magnetic media, such as a floppy disk, a flexible disk, a hard disk, reel-to-reel tape, cartridge tape, cassette tape or cards; optical media such as CD-ROM and writeable compact disc; magneto-optical media in disc, tape or card form; paper media, such as punched cards and paper tape; or on carrier wave signal received through a network, wireless network or modem, including radio-frequency signals and infrared signals.

SUMMARY OF THE INVENTION

The present invention features a method for writing file systems data operations to a storage medium, more particularly a method for writing file systems data operations to a storage medium being serviced by a plurality of servers, more specifically the clustered servers of a computer network. Such a methodology is particularly beneficial in that it allows recovery of file systems write data operations of a failed server so that these file systems write data operations can be written to the storage medium.

According to one aspect of the present invention, the method includes storing a file systems write data operation to a first temporary data store and mirroring the file systems write data operation in a second temporary data store. Such mirroring can be performed concurrent with or following the storing to the first temporary data store. In a specific embodiment, the method also includes sending a signal back to a source of the file system write data operation when it is determined that the file systems write data operation is successfully stored in the first and second temporary data stores.

The method also includes deleting the mirrored file systems write data operation from the second temporary data store in the case it is successfully written from the first temporary data store to the storage medium. In the case when the file systems write data operation is not successfully written from the first temporary data store, the method further includes writing the mirrored file systems write data operation from the second temporary data store to the storage medium.

When the storage medium is being serviced by a plurality of servers, and according to the method of the present invention, the file systems write data operation is stored in the first temporary data store of one of the plurality of servers and the file systems write data operation is mirrored in the second temporary data store of another one of the plurality of servers. Also in the case where the file systems write data operation is successfully written from the first temporary data store to the storage medium, the corresponding mirrored operation is deleted from the second temporary data store and in the case where it is not successfully written the mirrored file systems write data operation is written the second temporary data store to the storage medium.

According to another aspect of the present invention, there is featured a method for writing file systems write data operations to a storage medium being serviced by a plurality of servers. The method includes storing the file systems write data operation in the first temporary data store of one server, mirroring the write data operation in the second temporary data store of another server and monitoring the operational status of each server.

In the case where it is determined that one of the servers is not operational, the mirrored file systems write data operation is written from the second temporary data store of the other server to the storage medium. More particularly, all of the mirrored file systems write data operations stored in the second temporary data store of the other server are written to the storage medium, more specifically all such operations are written before accepting any new file system write data operations for writing to the storage medium. In specific embodiments, the method includes stopping the mirroring of file systems write data operations in the case when said one server is not operational; and restarting the mirroring of file systems write data operations in the case when said one server is returned to operation.

Also featured is a system and program for execution on a central processing unit of a server embodying such a methodology.

Other aspects and embodiments of the invention are discussed below.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
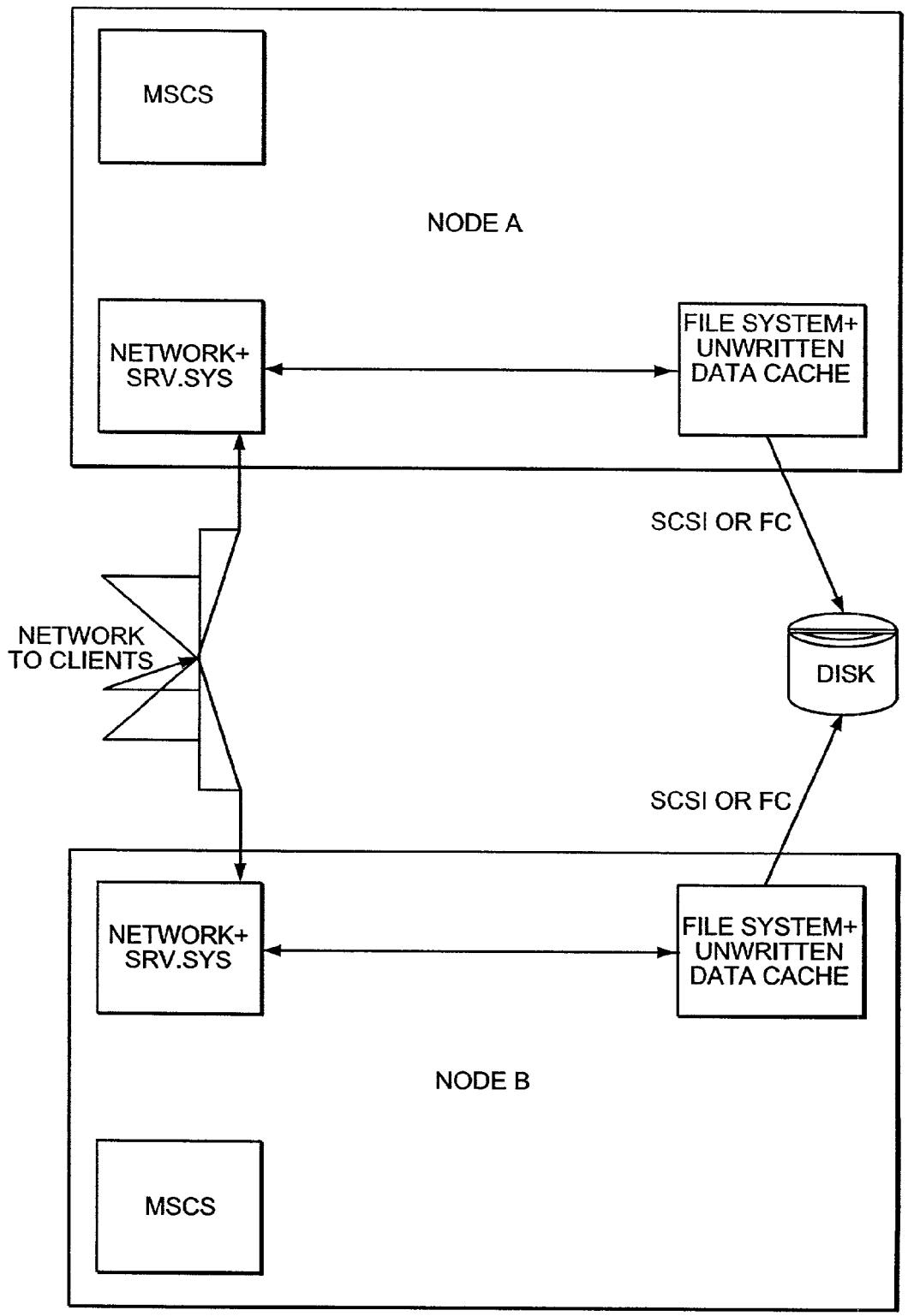
FIG. 1 is a schematic block diagram of a conventional clustered server/disk array system for use in a network environment.
Figure 2:
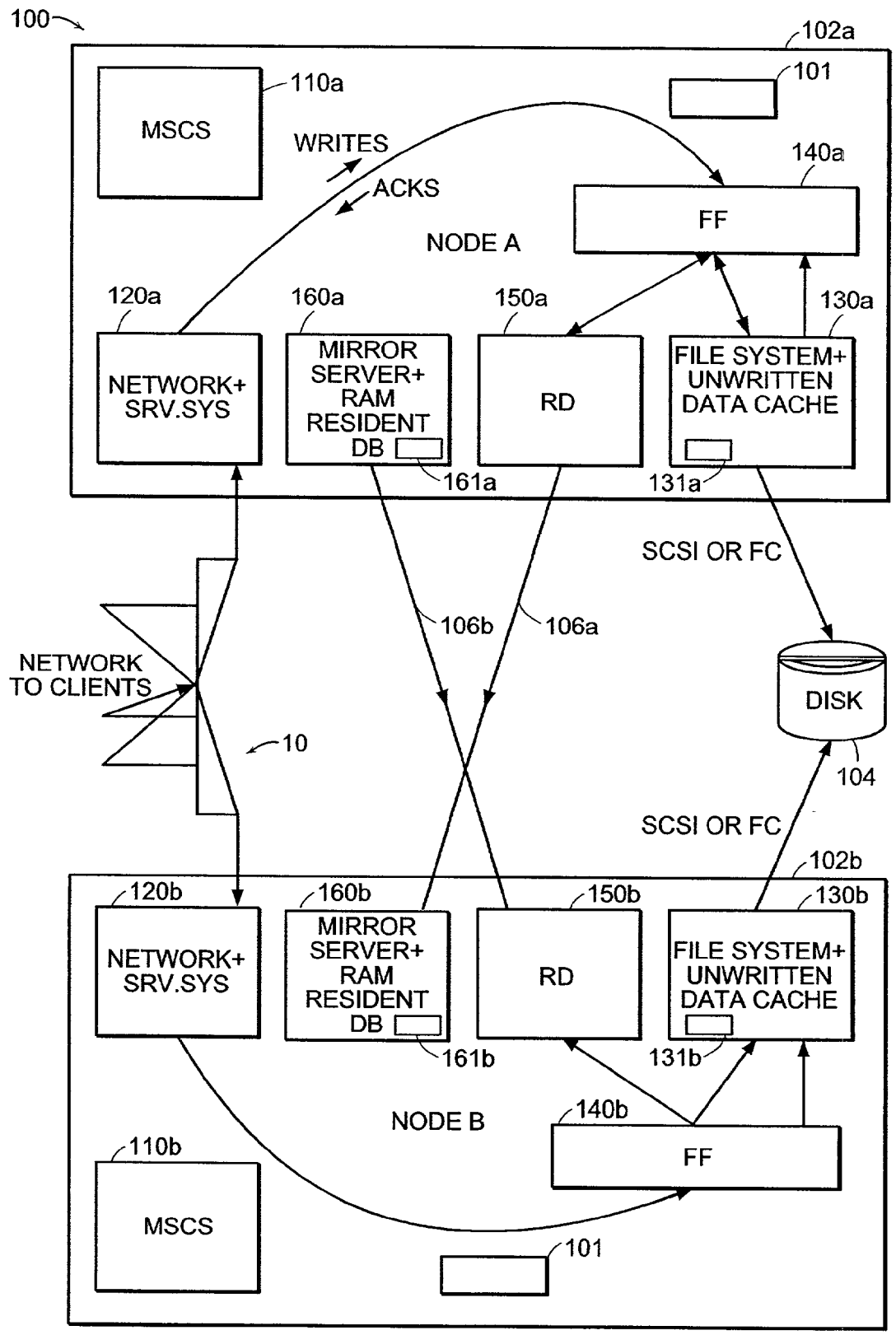
FIG. 2 is a schematic block diagram of a clustered server/disk array system according to the present invention for use in a network environment.

Referring now to the various figures of the drawing wherein like reference characters refer to like parts, there is shown in FIG. 2 a schematic block diagram of a clustered server/data storage system 100 according to the present invention for use in a network environment that includes a plurality of clusters servers 102*a,b* that are each operably interconnected to an external data storage medium 104. In the following discussion, the reference numeral 102 is used when generally referring to or describing the general characteristics of cluster servers, however, an alpha-numeric character is added to the reference numeral when reference is being made to the cluster server of a given node(s).

Each cluster server 102 is any of a number of servers known to those skilled in the art that are intended to be operably connected to a network 10 so as to operably link a plurality of client computers (not shown) via the network to the cluster servers and thus also to the external storage medium 104. As illustration, each cluster server 102 typically includes a central processing unit 101 including one or more microprocessors such as those manufactured by Intel or AMD, random access memory (RAM), mechanisms and structures for performing I/O operations, a storage medium such as a magnetic hard disk drive(s), and an operating system for execution on the central processing unit. This hard disk drive typically is not used for storing data and the like utilized by client applications being executed on the client computers. Rather the hard disk drive(s) of the cluster server 102 are provided for purposes of booting and storing the operating system, other applications or systems that are to be executed on the server, paging and swapping between the hard disk and the RAM.

Data and the like being used in connection with the execution of client applications on client computers is stored in the external storage medium 104 that is operably interconnected to each cluster server 102*a,b* using any of a number of techniques and related devices or cabling known to those skilled in the art. In an illustrative embodiment, such an interconnection is implemented using a small computer systems interface (SCSI) technique(s) or via a fiber optic cable or other high speed type of interconnection.

In an illustrative, exemplary embodiment, the external storage medium 104 comprises a disk assembly typically made up of one or more hard disks that are configured and arranged so the external storage medium functionally appears to each of the cluster servers 102 as a single hard disk. Such an external storage medium is further configured and arranged to implement any of a number of storage schemes such as mirroring data on a duplicate disk (RAID level 1) or providing a mechanism by which data on one disk, which disk has become lost or inaccessible, can be reconstructed from the other disks comprising the storage medium (RAID level 5). Although reference is made to a disk assembly and hard disks, this is for illustration and shall not be construed as being a limitation on the particular form of the devices or mechanism that makes up the external storage medium 104.

When in a cluster server type of an environment, particularly those utilizing or implementing Microsoft Cluster Server (MSCS), each cluster server is configured so as to have ownership over a particular portion of the storage medium 104. For example, for an external storage medium 104 including one or more hard disks, the ownership over a set of logical cluster numbers or logical unit numbers (LUNS) defining a portion of the hard disk (e.g., LUNS 1–n) is assigned to the Node A cluster server 102a and ownership over another set of LUNS defining another portion of the hard disk (e.g., LUNS n+1–m) is assigned to the Node B cluster server 102b. Stated another way the LUNS defining each of these hard disk portions are exposed respectively to either the Node A cluster server 102a or the Node B cluster server 102b. Because of this assignment of ownership over different LUNS, the Node A cluster server 102a normally will handle client applications trying to access LUNS 1–n and the Node B cluster server 102b normally will handle client applications trying to access LUNS n+1–m.

Now referring back to FIG. 2, there also are shown schematically the functional blocks of the operating system and/or software that are executed on each cluster server 102 as well as the related hardware of each cluster server all of which comprising the present invention. As hereinafter described, these functionalities in combination with the related hardware are particularly suited for effecting data operations (e.g., writes) from the client application(s), mirroring of such data operations and recovering mirrored data operations according to the methodology of the present invention, more particularly recovering mirrored data operations in cases where there is a failure of a cluster server of the clustered server/data storage system 100.

As shown in FIG. 2, the invention specific functionalities and related hardware of each cluster server 102a,b include: a cluster server application 110a,b; a network stack 120a,b; a file system/unwritten data cache 130a,b; a file system filter driver 140a,b; a re-direct filter driver 150a,b; and a mirror server/data store 160a,b. The clustered server/data storage system 100 also includes communication links or communication interconnects 106a,b that are each configured and arranged so as to link or connect (i.e., establish a communications path between) the re-direct filter driver 150a of the Node A cluster server 102a with the mirror server/data store 160b of the Node B cluster server 102b and the re-direct filter driver 150b of the Node B cluster server 102b with the mirror server/data store 160a of the Node A cluster server 102a. In the following discussion, reference numerals 110, 120, 130, 140, 150, 160 are used respectively when generally referring to or describing the general characteristics of a cluster server application, a network stack, a file system/unwritten data cache; a file system filter driver, a re-direct filter driver, a mirror server/data store, and the communication interconnects, however, an alpha-numeric character is added to the reference numeral when specific reference is being made to the specific element of a given node(s)/node server(s).

Each cluster server application 110a,b is a software application for execution on each of the cluster servers 102a,b that is configured and arranged, more particularly includes instructions and criteria, so as to assure that at any given time at least one path, more specifically one path, exists from the remote client (i.e., client application) through the network 10, and through the network stack 120 and file system/unwritten data cache 130 of a given cluster server to the external storage medium 104. Additionally, and as more particularly described hereinafter, the cluster server applications 110a,b of both cluster servers 102a,b continuously monitor the operational status of the other cluster server, including the operational status of software (e.g., operating systems) being executed on the other server and provide output signals, a message or the like when it is determined that one of the cluster servers has failed and also when it is determined that the failed cluster server has been recovered or is again operational. Typically a communications link is established between the cluster serve applications 110a,b running on both cluster servers 102a,b through the network 10 so the foregoing can be effected. In an illustrative exemplary embodiment, the cluster server application 110 is the Microsoft Cluster Server that is available with Microsoft Windows NT or Windows 2000 operating system.

The network stack 120 typically is part of the operating system running on each cluster server that provides access to the filesystems on the external storage medium 104 being served by a given cluster server to a client (i.e., client application) remote from the cluster server via the network 10. In an illustrative exemplary embodiment, the network stack 120 is a conventional Microsoft/NT network stack or network file server driver that provides such access to filesystems using the SMB/CIFS protocol. A conventional network stack includes at least: one or more hardware drivers for communicating with the physical network connections, one or more protocol drivers for implementing known networking protocols such as for example IP and TCP/IP, and a server driver that responds to remote file requests from network clients or client applications, in an exemplary case using SMB/CIFS protocol.

The network stack 120 of each cluster server 102 is operably interconnected to the file system filter (FF) driver 140 of the associated cluster server so the FF driver receives and intercepts all file systems write data operations from a remote client/client application and provides appropriate output signals, messages or the like to the network stack in appropriate circumstances. In the present invention, data operations broadly includes any of a number of operations that involve accessing files/file systems on the external storage medium 104 and such operations include; writes, deletes, renaming and changing of permissions on the file. Also, and as known to those skilled in the art, the term driver is generally used to describe kernel-mode modules that interface between the I/O system and the relevant hardware and filter drivers is generally descriptive of drivers that intercept I/Os and perform some added-value processing before passing the I/O to the next layer.

The FF driver 140 is a software application executed on each cluster server 102 that is configured and arranged, more particularly includes instructions and criteria, for performing a number of functions as well as providing output signals, messages or the like when certain conditions are meet. In general terms, the FF driver 140 receives and intercepts all file system write data operations from a remote client/client application for the filesystems being served by a given cluster server, passes on each of the received file systems write data operations to the file system/unwritten data cache 130 and transmits, sends or redirects a copy of the received file system write data operation to the re-direct filter (RD) driver 150. The specific functions and output signals being provided are more particularly described in connection with the below discussion of FIGS. 3–4.

The file system/unwritten data cache 130, which is operably connected to the FF driver 140, is composed of hardware and software. Typically, the software is a part of the operating system executed on each cluster server 102 and the hardware is a temporary storage medium or data cache 131, typically a part or piece of the RAM for the cluster server. Typically, a portion of the RAM for the cluster server 102 is set aside by the operating system as the unwritten data cache 131 to store each of the file systems write data operations prior to the time when the file systems write data operation to the external storage medium 104 is undertaken by the given cluster server.

The software implements any one of a number of techniques or methodologies known to those skilled in the art that receives the filesystems write data operation generated by the client, stores the filesystem write data operation in the unwritten data cache 131, and performs the cache to external storage medium 104 write data operation. In general, modern operating systems provide a filesystem or unwritten data cache because of the large performance penalties that accrue if it is not used. In an exemplary illustrative embodiment, the software comprises a conventional Microsoft/NT NTFS file system. The functionalities or functions of the software comprising the file system/unwritten data cache 130 and any signals, messages or the like being generated thereby are more particularly described in connection with the below discussion of FIGS. 3–4.

The RD driver 150 is a software application executed on each cluster server 102 that is configured and arranged, more particularly includes instructions and criteria, to perform a number of functions as well as providing output signals when certain conditions are meet. The RD driver 150a for the cluster server 102a for one node (e.g., Node A) is operably connected to the FF driver 140a of the same cluster server 102a and is operably connected to the mirror server/data store 160b of the cluster server 102b of the other node (e.g., Node B) via a communication interconnection 106a. Similarly, the RD driver 150b for the cluster server 102b for the other node is operably connected to the FF driver 140b of the same cluster server 102b and is operably connected to the mirror server/data store 160a of the cluster server 102a of said one node via a communication interconnection 106b.

In general terms, the RD driver 150 of any one node transmits a copy of each filesystem write data operation that is intercepted by the FF driver 140a of that same node to the mirror server/data store 160 of the other node. The RD driver 150 of the any one node, responsive to a signal or functional equivalent from the mirror server/data store 160 of the other node also communicates a signal or the functional equivalent to the FF driver 140 of the any one node indicating successful writing or copying of the filesystems write data operation to the mirror server/data store 160 of the other node. Further, when it is determined that the filesystems write data operation was successfully performed, the RD driver 150 of the any one node communicates a signal or functional equivalent to the mirror server/data cache 160 of the other node. Such communications between the RD driver 150 of any one node and the mirror server/data store 160 of the other node are carried out via the communication interconnection 106 therebetween. The specific functions and output signals being provided are more particularly described in connection with the below discussion of FIGS. 3–4.

The communications links or communications interconnects 106a,b each implement any one of a number of communications techniques and/or protocols known to those skilled in the art. Such communications interconnects 106a,b generally include those type of interconnects or communications techniques that allow for rapid, high speed communication between the RD driver 150a of one node (e.g., Node A) and the mirror server/data store 160b of the other node (e.g., Node B). In an exemplary illustrative embodiment, each of the communication interconnects 106a,b is in the form of a fiber optic channel, however, other methods or communications interconnects or links such as Gigabit Ethernet and Infiniband are contemplated for use in the present invention.

The mirror server/data store 160a,b is composed of hardware, a temporary data storage medium 161, and software, the software being program for execution on each cluster server 102a,b. In an illustrative embodiment, the temporary data storage medium 161 comprising the hardware is a part or piece of the RAM for the central processing unit 101 of the cluster server. Typically, a portion of the RAM for the cluster server 102b for one node (e.g., Node B) is set aside by the operating system of that cluster server to store the copy of each filesystems write data operation being transmitted from the RD driver 150a of the other node (e.g., Node A). Alternatively, the temporary data storage medium 161 is a separate high-speed read/write storage medium including battery backed random access type of memory, non-volatile random access memory or a solid-state disk unit.

In general terms, the software comprising each mirror server/data store is configured and arranged, more particularly includes instructions and criteria, to receive and store (i.e., mirror) a copy of each filesystem write data operation being intercepted by the FF driver 140a and transmitted by the RD driver 150a for the cluster server 102a of one node (i.e., Node A) and for outputting a signal, message or the functional equivalent back to the cluster server 102a of the one node when copying is complete. The software also is configured and arranged, more particularly includes instructions and criteria, to purge each copy from the temporary storage medium 161 after receiving an appropriate signal from the cluster server 102a of the one node and for copying each of the mirrored filesystem write data operations to the external storage medium 104 when certain conditions are determined to exist. The functions and output signals being provided are more particularly described in connection with the below discussion of FIGS. 3–4.

Figure 3:
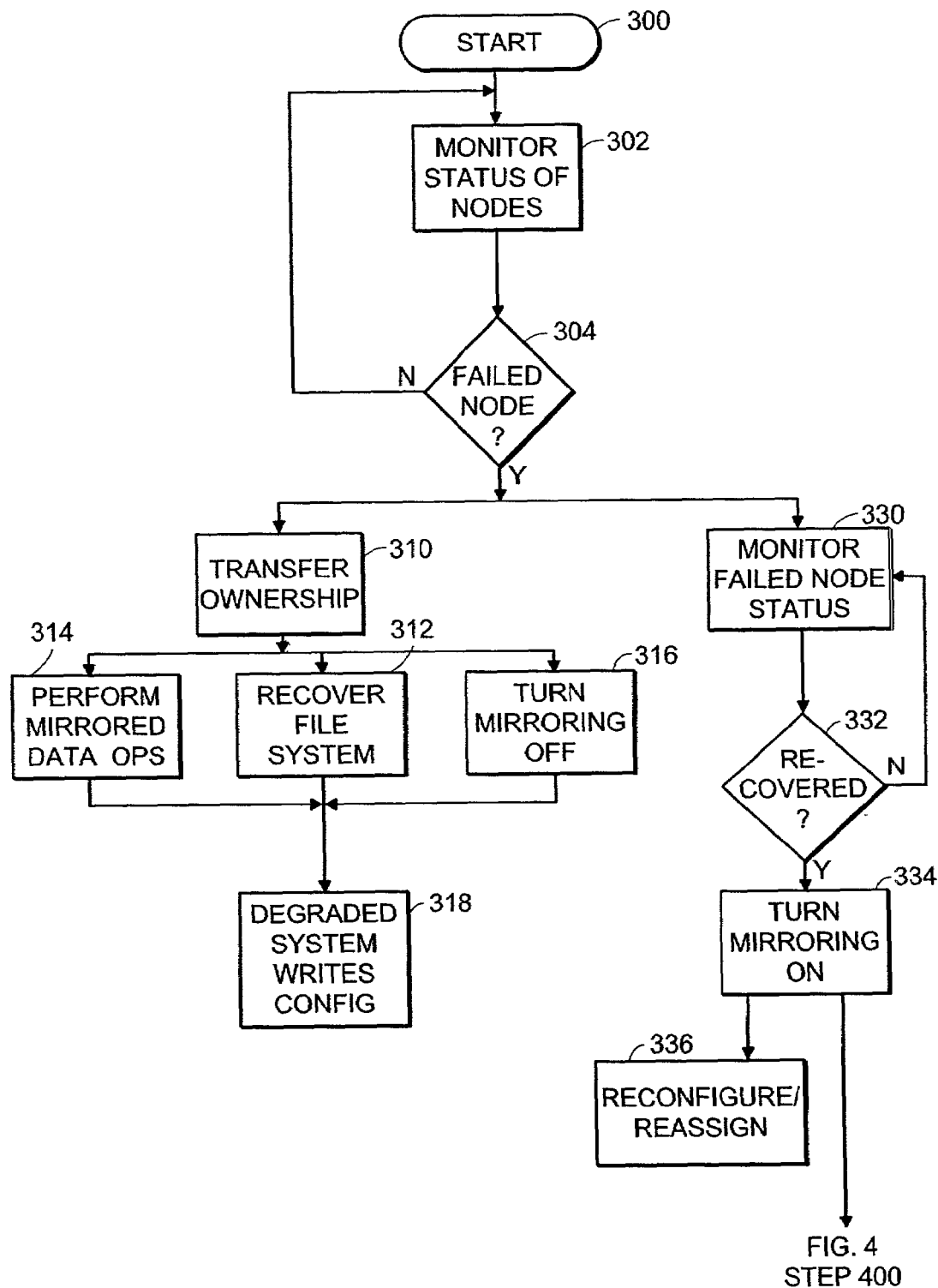
FIG. 3 is a flow diagram of a process according to the present invention for handling the failure and recovery of a cluster server node.
Figure 4:
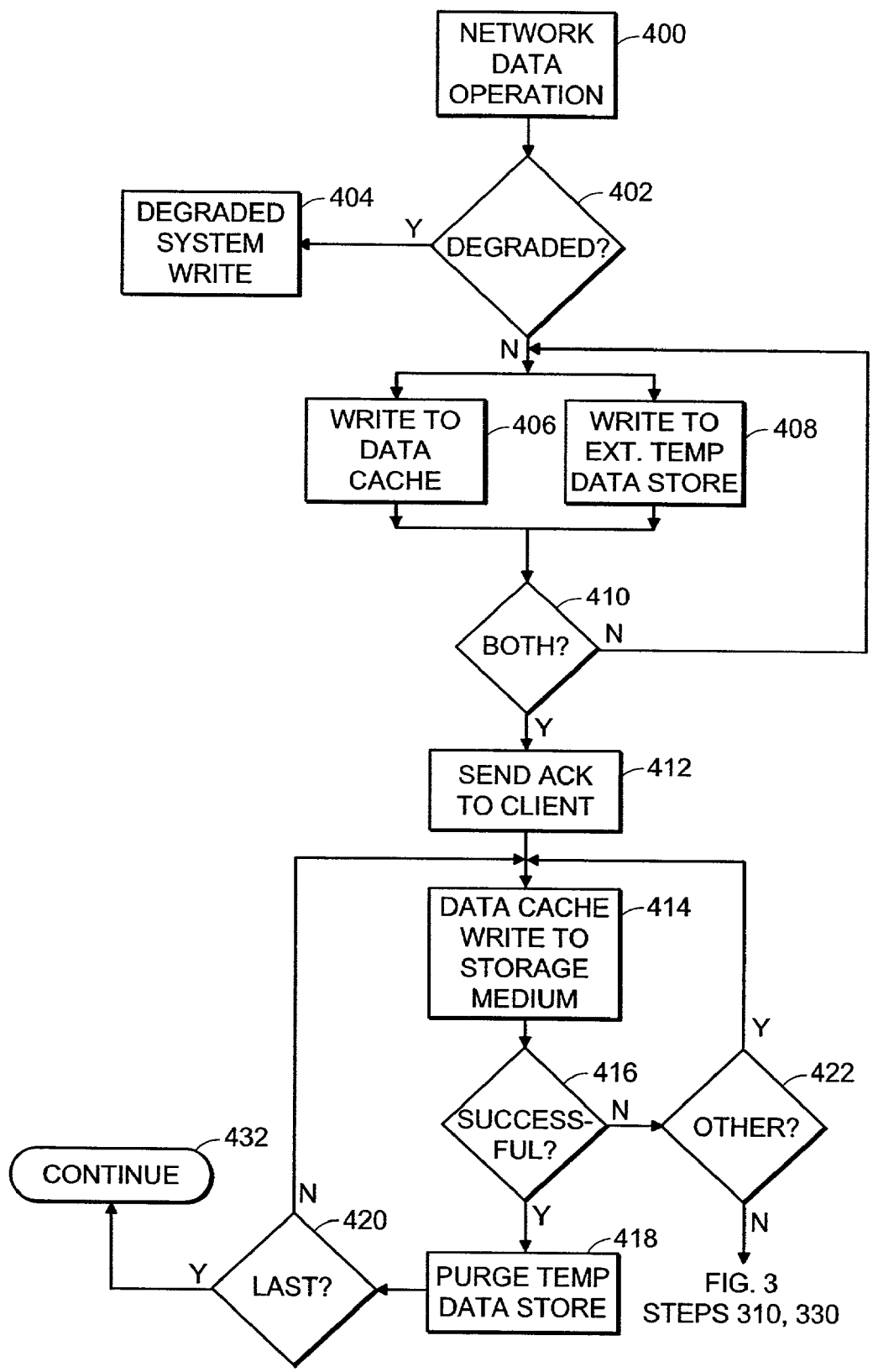
FIG. 4 is a flow diagram of a process according to the present invention for performing data operations/writes in a network environment.

Referring now to FIGS. 3–4, there are shown flow diagrams of high level processes of the aforementioned software according to and embodying the methodology of the present invention that is capable of being executed on each of the cluster servers 102 comprising the present invention. The process of FIG. 3 is illustrative of the high level process for monitoring and handling an arrangement of clustered servers 102 such as that illustrated in FIG. 2 and FIG. 4 is illustrative of the high level process for controlling the writing of filesystems write data operations to an external storage medium 104 as more particularly described hereinafter. In an illustrative embodiment, the software is executed on the central processing unit 101 of the cluster server 102, however, it is within the scope of the present invention for the cluster server to be configured and arranged as a multiprocessor type of computing system in which the functionalities of the present invention are distributed amongst each processor of the server as well as for providing a processor unit to specifically perform the functionalities of the present invention. Reference shall be made to FIG. 2 and the foregoing discussion therefore, for components, elements, features or functionalities discussed below but not otherwise shown in FIGS. 3–4.

Referring specifically to FIG. 3, there is shown a high level process for monitoring each of the clustered servers 102 such as that illustrated in FIG. 2, handling the failure of a cluster server including recovering unwritten filesystem data operations and handling a recovered failed cluster server. As provided above, in a cluster server environment, each cluster server 102a,b server is configured and arranged so as to have ownership over a particular portion of the external storage medium 104, more specifically ownership over a set of LUNS that define the particular portion of the external storage medium. Thus, after the clustered servers 102 are started, STEP 300, and as indicated in the foregoing, the cluster server application 110a,b of each cluster server operates so as to assure that at any given time only one path exists from the remote client (i.e., client application) through the network 10, and through the network stack 120 and file system/unwritten data cache 130 of a given cluster server to the external storage medium 104.

Additionally, and as more particularly described hereinafter, the cluster server applications 110a,b of both cluster servers 102a,b continuously monitor the operational status of each other cluster server, including the operational status of the operating system, STEP 302 to determine if a cluster server 102a of a given node, Node A for example, has failed, STEP 304. This is typically accomplished by using a communications link that is established between the cluster servers 102a,b via the network 10. If it is determined that both cluster servers 102a,b remain operational (NO, STEP 3) then the cluster server applications 110a,b of both cluster servers continue to operate to assure that at any given time at least one path, more specifically one path exists from the remote client (i.e., client application) through the network 10, and a given cluster server to the external storage medium 104 and continues to monitor the operational status of the cluster servers.

If it is determined that a cluster server, for example the cluster server of Node A, has failed (YES, STEP 304), then the cluster server application 110b of the operating cluster server, the cluster server 102b of Node B, causes a transfer of the ownership over that portion of the external storage medium 104 owned by the Node A cluster server 102a to the Node B cluster server, STEP 310. More particularly, the cluster server application 110b of the Node B cluster server 102b will tell the file system/unwritten data cache 130b of the Node B cluster server to take over the LUNS (e.g., LUNS 1–n) that were owned by the Node A cluster server 102a. Thus, the Node B cluster server 102 will thereafter take over serving the filesystems formerly served by the failed cluster server 102a. Such transfer of ownership is typically effected seamlessly such that the remote clients using these filesystems do not that there has been a failure of a cluster server. It should be noted that this transfer in ownership process is well known in the art.

In addition to transferring ownership, any other actions as is known to those skilled in the art to recover or clean up the storage medium 104 are implemented, STEP 312. Such actions, however, are exclusive of those involved with assuring the writing to the storage medium of the unwritten filesystem write data operations in the filesystem unwritten data cache 130a of the failed cluster server, for example the Node A cluster server 102a, and the re-configuring of the operational cluster server for future writes in a degraded mode.

As hereinafter described, a copy of all unwritten filesystem write data operations of the failed cluster server 102a, also is maintained in the mirror server/data store 160b of the operational cluster server 102b. Such data operations are inclusive of, but not limited to, data writes, deletes, renames and the changing of permissions on a file. As such, in addition to the foregoing recovery actions, the Node B cluster server 102b causes the unwritten, mirrored data operations in the data store, temporary data cache or temporary storage medium 161 of the Node B mirror server/data store 160b to be replayed and written to the external storage medium 104, STEP 314.

Unwritten mirrored data operations shall be understood to general mean the filesystems write data operations that were re-directed by the RD driver 150a of one cluster server, the Node A cluster server 102a for example, to the mirror server/data store 160b of the other cluster server, the Node B cluster server 102b, and which were not or not completely flushed out of the filesystem/unwritten data cache 130a of the Node A cluster server (i.e., not or not completely written from the unwritten data cache 131 to the external storage medium 104). More particularly, each of the unwritten mirrored data operations are taken from the Node B mirror server/data store 160b and sent onto the Node B FF driver 140b, thence through the Node B filesystem/unwritten data cache 130b and then onto the external storage medium 104. This process is repeated until all of the unwritten mirrored data operations have been written to the external storage medium 104.

Further, to the replaying of the unwritten data operations, the operational cluster server 102b also causes the mirroring process of the operational cluster server to be turned off, STEP 316. More particularly, the FF driver 140b and/or the RD driver 150b of the operational cluster server 102b are set so that any of the filesystem write data operations being received thereafter are not intercepted and/or not redirected to the mirror server/data store 160a of the failed cluster server 102a.

In addition to turning the mirroring process off, the operational cluster server 102b also causes the Node B filesystem/unwritten data cache 130b to be configured or set for performing degraded system writes, STEP 318. In one illustrative embodiment, when operating in a degraded condition, the Node B filesystem/unwritten data cache 130b is configured to minimize or eliminate the potential for loss of data operations by having each received write data operation written directly and immediately to the external storage medium 104. This is similar to the write-through algorithm of a FAT type of file system. In this embodiment, the unwritten data cache 131 is in effect turned off and the write data operations do not pass through nor are they held up in the data cache comprising the Node B filesystem/unwritten data cache 130b. In an alternative, illustrative embodiment, the Node B filesystem/unwritten data cache 130b is configured so as to implement a cache write-through methodology where write operations are forced so as to be immediately recorded to the external storage medium 104. In addition to immediately writing to the storage medium, the signal back to the client from the operating system for the Node B cluster server 102b indicating a successful write also can be delayed so as to be sent following a successful write to the external storage medium 104.

Alternatively, the Node B filesystem/unwritten data cache 130b can remain configured as it was before the failure of Node A so as to implement for example a cache flushing type of write technique. This reduces the reduction in performance when doing direct and immediate writes to the external storage medium 104, but also increases the potential for lost write data operations if the Node B cluster server 102b subsequently fails.

Following the failure of the Node A cluster server 102a, the cluster server application 110b of the operational Node B cluster server 102b also monitors the status of the failed cluster server, STEP 330 to determine when the Node A cluster server has been recovered or is considered in an operational status, STEP 332. Until the Node A cluster server 102a is recovered or made operational (NO, STEP 332), the Node B cluster server application 110b continues to monitor the status of the failed cluster server.

When it is determined that the Node A cluster server 102a is returned to operational status, the Node B cluster server application 110b provides the appropriate outputs so the Node B cluster server 102b is re-configured so as to turn the mirroring of received write data operations back on, STEP 334. More particularly, the FF driver 140b and/or the RD driver 150b of the Node B cluster server 102b are set so that each of the filesystem write data operations received thereafter by the Node B cluster server is intercepted and re-directed to the Node A mirror server/data store 160a. Other signals and functions associated with the mirroring of such write data operations also are returned to their operational mode. Thereafter, the filesystem write data operations process returns to the process shown In FIG. 4, specifically to STEP 400 thereof.

In this embodiment, there is no transfer in ownership over portions of the external storage medium 104. Instead the Node B cluster server continues to retain ownership over all portions or LUNS of the external storage medium. The re-configuration of each of the cluster servers 102a,b and the re-assignment of ownership over portions or LUNS of the storage medium 104 is accomplished manually at some later time.

In an alternative embodiment, following recovering of a failed cluster (YES, STEP 332) and in addition to turning the mirroring process back on (STEP 334), each of the cluster servers 102a,b is automatically re-configured and the ownership over portions or LUNS of the storage medium is automatically re-assigned, STEP 336. The timing for performing such re-configuring and re-assigning preferably is established or set so as to minimize the impact on the performance of client applications. For example, a particular time of day is selected when the level of activity or generation of filesystem write data operations is typically low. Alternatively, such re-configuring and re-assigning is performed along with turning the mirroring process back on (STEP 334).

As indicated above, the process for writing filesystem write data operations according to the present invention is controlled so as to mirror the filesystem write data operations being received by one of the cluster servers 102a,b in a data store of the other of the cluster servers. Referring specifically to FIG. 4 there is shown a high level process for controlling the writing of filesystem write data operations to an external storage medium including the process for mirroring filesystem write data operations being received by one of the cluster servers 102a,b in a data store of the other of the cluster servers. The following discussion describe the process in terms of a single filesystem write data operation to one of the cluster servers 102a,b, for example to the Node A cluster server 102a. This, however, shall not particularly limit the illustrated process as to the number of write data operations that can be processed, the write data operations that can be mirrored, nor the number of cluster servers 102 comprising the cluster.

The writing of data operations by a cluster server 102a is precipitated by the issuance of a filesystems write data operation by a client application that is communicated via the network 10 to one of the Node A and B cluster servers 102a,b, STEP 400. As indicated above in the discussion regarding FIGS. 2–3, the cluster server applications 110a,b assure that at any given time at least one, more specifically only one, path exists from the remote client (i.e., client application) through the network 10, and through the network stack 120 and file system/unwritten data cache 130 of a given cluster server to the external storage medium 104.

After receiving the filesystems write data operation, a determination is made as to whether there is a failed cluster server, thus corresponding to a degraded condition, STEP 402. As provided in the discussion above regarding FIG. 3, if there is a failed cluster server corresponding to a degraded condition (YES, STEP 402) then the received filesystems write data operation is written to the storage medium 104 according to the degraded write protocol that is established, STEP 404. Some exemplary write protocols useable in such a degraded condition are more particularly described hereinabove (e.g., see FIG. 3, STEP 318 discussion).

If both of the cluster servers are operational (NO, STEP 402), then the received filesystems write data operation is communicated by the Node A network stack 120a to the Node A FF driver 140a. The Node A FF driver 140a passes the received filesystem write data operation onto the Node A filesystem/unwritten data cache 130a, where it is written to the unwritten data cache 131a, STEP 406. The Node A filesystem/unwritten data cache 130a sends a signal or the equivalent back to the Node A FF Driver 140a to indicate that there was a successful write of the filesystems write data operation to the unwritten data cache 131a thereof.

The Node A FF driver 140a also causes a duplicative copy of the received filesystems write data operation to be written to the Node B mirror server/data store 160b, STEP 408. More particularly, the Node A FF driver 140a re-directs or hands off a copy of the received filesystems write data operation to the Node A RD driver 150a. The Node A RD driver 150a takes this copy and transmits it to the Node B mirror server/data store 160b over the communications interconnect 106a that is a high-speed low latency type of interconnection. In other words the filesystems write data operation being received in the Node A cluster server 102a is mirrored or duplicatively copied in the Node B cluster server 102b.

The Node B mirror server/data store 160b sends a signal or equivalent back to the Node A RD driver 150a to indicate that there was a successful write of the filesystems write data operation to the temporary data storage medium 161b of the Node B mirror server/data store. The Node A RD driver 150a in turn returns a signal or equivalent to the Node A FF driver 140a confirming the successful writing to the Node B mirror server/data store 160b.

The Node A FF driver 140a looks to see if a successful write to signal, message or equivalent has been received from both the Node A filesystem/data cache 130a and the Node A RD driver 150a, STEP 410. If a successful write was not accomplished to both (NO, STEP 410), then the process returns to writing the filesystems write data operation to either or both of Node A filesystem/unwritten data cache 130a and the Node B mirror server/data store 160b. If there was a successful write (YES, STEP 410), then the Node A FF driver 140a causes the Node A cluster server 102a to return an acknowledgment signal, message or equivalent back to the client application, STEP 412. Upon receipt of the acknowledgment, the client application considers the write operation complete and thus, the actual writing of the filesystems data operations to the external storage medium 104 occurs as a background activity from the standpoint of the client application.

After acknowledging, the unwritten filesystems write data operation is written from the unwritten data cache 131*a* of the Node A filesystem/unwritten data cache is 130*a* to the external storage medium 104, STEP 414. As indicated above, most modern computing systems accumulate filesystems write data operations in a data cache before writing the accumulated unwritten data operations, by flushing or writing a batch of these data operations at a given time, as determined by the writing protocol being implemented. Thus, in accordance with the particular writing protocol, procedure or technique being implemented, each of the unwritten filesystems write data operations being stored in the Node A unwritten data cache 131*a* are written to the external storage medium 104. This is continued until all of the unwritten filesystems write data operations of the batch or grouping are written to the external storage medium 104.

This writing to the external storage medium 104 or disk is evaluated to determine if the unwritten filesystems write data operation is successfully written from the Node A data cache 131*a* to the external storage medium 104, STEP 416. If the unwritten data operation was successfully written to the storage medium 104 YES, STEP 416), then a signal, message or equivalent is generated so as to cause the corresponding duplicate or mirrored copy of the unwritten filesystems write data operation to be purged from the temporary storage medium 161*b* or temporary data store of the Node B mirror server/data store 160*b*, STEP 418. If this is not the last unwritten filesystems write data operation of the batch or grouping to be written (NO, STEP 420), then the process continues by writing the next unwritten filesystems write data operation to the storage medium 104, STEP 414, determining if it has been successfully written to the external storage medium 104, STEP 416 and purging the mirrored copy if the write was successful, STEP 418. If this is the last unwritten write data operation (YES, STEP 420), then the process continues with the next appropriate action, STEP 422 such as handling another data operation from the network and/or writing another group or batch of unwritten data operations form the Node A data cache 131*a* to the storage medium.

If the unwritten data operation is not successfully written to the storage medium (NO, STEP 416), then a determination is made as to the cause for the failure, STEP 422. If it is determined that the failure to write resulted from the failure of the Node A cluster server 102*a* (NO, STEP 422), then the process reverts to the process of FIG. 3, steps 310, 330 and those steps that follow. In other words, the process proceeds to write the corresponding unwritten duplicative data operations mirrored on the Node B cluster server 102*b* to the external storage medium 104 as part of the recovery process as described above. If it is determined that the failure to write was other than a failure of a cluster server (YES, STEP 422), then an other attempt is made to write the unwritten filesystems write data operation to the storage medium.

The foregoing writing process/operation more particularly includes writing an unwritten filesystems data operation from the Node A unwritten data cache 131*a* to the external storage medium 104 and at the same time sending the unwritten filesystems data operation from the Node A unwritten data cache to the Node A FF driver 140. As the unwritten filesystems data operation flows through the Node A FF driver 140*a*, the Node A FF driver sees the filesystems write data operation for a second time.

When the Node A FF driver 140*a* sees the complete filesystems data operation for the second time, the Node A FF driver sends a signal, message or equivalent to the Node A RD driver 150*a* that is forwarded onto the Node B mirror server/data store 160*b*. This signal, message or equivalent directs the Node B mirror server/data store 160*b* to purge or dump the corresponding duplicative unwritten filesystem write data operation from the temporary data store or temporary storage medium 161*b* thereof. In addition, the Node A filesystem/unwritten data cache 130*a* outputs a signal, message or the like to the Node A FF driver 140*a* when the downloading or writing is completed for what had been termed the unwritten filesystems write data operation.

The above-described writing process illustrated in FIG. 3 takes place in the background from the standpoint of the client applications. Thus, the operational performance of the client application or the running of the client application is not directly and negatively affected by the writing, mirroring and purging process of the present invention. The operational performance and running of the client application is beneficial affected by this writing, mirroring and purging process because this process provides a mechanism to recover unwritten or incompletely written filesystems write data operations that are stored in a data cache of a failed cluster server and for writing these recovered data operations to the storage medium 104. This thereby, advantageously prevents loss of data to be stored and/or corruption of data stored in the external storage medium 104 in the case where one node of clustered servers fails. Further, the implementation of the methodology according to the present invention in software can be accomplished in a way that does not require modifications to or special hooks into the host operating system, for example Microsoft Windows NT or Windows 2000.

Although a preferred embodiment of the invention has been described using specific terms, such description is for illustrative purposes only, and it is to be understood that changes and variations may be made without departing from the spirit or scope of the following claims.

What is claimed is:

1. A method for writing file systems write data operations to a storage medium comprising the steps of:
   storing a file systems write data operation in a first temporary data store;
   mirroring the file systems write data operation in a second temporary data store; and
   deleting the mirrored-file systems write data operation from the second temporary data store upon receiving of a signal indicating that the file systems write data operation is successfully written from the first temporary data store to the storage medium.

2. The method of claim 1, further comprising the step of:
   writing the mirrored file systems write data operation from the second temporary data store to the storage medium upon receiving of a signal indicating that the file systems write data operation is not successfully written from the first temporary data store.

3. The method of claim 1, further comprising the step of:
   determining if the file systems write data operation is successfully written from the first temporary data store.

4. The method of claim 1, wherein said mirroring is performed one of concurrent with, during, or following said storing of the file systems write data operation in the first temporary data store.

5. The method of claim 1, further comprising the step of:
sending a signal back to a source of the file system write data operation when it is determined that the file systems write data operation is successfully stored in the first and second temporary data stores.

6. The method of claim 1, wherein the storage medium is serviced by a plurality of servers, each server including the first and second temporary data stores and wherein:
said storing includes storing the file systems write data operation in the first temporary data store of the one of the plurality of servers;
said mirroring includes mirroring the file systems write data operation being stored in the first temporary data store of said one of the plurality of servers in the second temporary data store of another of the plurality of servers; and
said deleting includes deleting the mirrored file systems write data operation from the second temporary data store of said another of the plurality of servers in the case when the file systems write data operation is successfully written from the first temporary data store of said one of the plurality of servers to the storage medium.

7. The method of claim 6, wherein said writing includes writing the mirrored file systems write data operation from the second temporary data store of said another of the plurality of the servers to the storage medium in the case when the file systems write data operation is not successfully written from the first temporary data store of said one of the plurality of servers.

8. The method of claim 6, further comprising the step of determining if the file systems write data operation is successfully written from the first temporary data store of said one of the plurality of servers.

9. The method of claim 6, wherein said mirroring is performed one of concurrent with, during or following said storing of the file systems write data operation in the first temporary data store of said one of the plurality of servers.

10. The method of claim 6, wherein said writing the mirrored file systems write data operation from the second temporary data store of said another of the plurality of servers to the storage medium is done in the case when at least one of:
(a) it is determined that said one of the plurality of servers is not operational;
(b) it is determined that an operating system of said one of the plurality of servers is not operational; or
(c) it is determined that an operating system I/O of said one of the plurality of servers is not operational.

11. A method for writing file systems write data operations to a storage medium comprising the steps of:
storing a file systems write data operation in a first temporary data store;
mirroring the file systems write data operation stored in a second temporary data store;
determining if the file systems write data operation stored in the first temporary data store is successfully written to the storage medium;
deleting the file systems write data operation from the second temporary data store when it is determined that the file systems write data operation was successfully written from the first temporary data store to the storage medium; and
writing the mirrored file systems write data operation from the second temporary data store to the storage medium when it is determined that the file systems write data operation was not successfully written from the first temporary data store to the storage medium.

12. The method of claim 11, wherein said mirroring is performed one of concurrent with, during, or following said storing of the file systems write data operation in the first temporary data store.

13. The method of claim 11, further comprising the step of:
sending a signal back to a source of the file system write data operation when it is determined that the file systems write data operation is successfully stored in the first and second temporary data stores.

14. The method of claim 11, wherein the storage medium is serviced by a plurality of servers, each server including the first and second temporary data stores and wherein:
said storing includes include storing the file systems write data operation in the first temporary data store of the one of the plurality of servers;
said mirroring includes mirroring the file systems write data operation being stored in the first temporary data store of said one of the plurality of servers in the second temporary data store of another of the plurality of servers;
said deleting includes deleting the mirrored file systems write data operation from the second temporary data store of said another of the plurality of servers in the case when the file systems write data operation is successfully written from the first temporary data store of said one of the plurality of servers to the storage medium; and
said writing includes writing the mirrored file systems write data operation from the second temporary data store of said another of the plurality of the servers to the storage medium in the case when the file systems write data operation is not successfully written from the first temporary data store of said one of the plurality of servers.

15. The method of claim 14, wherein said writing the mirrored file systems write data operation from the second temporary data store of said another of the plurality of servers to the storage medium is done in the case when at least one of:
(a) it is determined that said one of the plurality of servers is not operational;
(b) it is determined that an operating system of said one of the plurality of servers is not operational; or
(c) it is determined that an operating system I/O of said one of the plurality of servers is not operational.

16. A method for writing file systems write data operations to a storage medium being serviced by a plurality of servers, each server including a first temporary data store and a second temporary data store, said method comprising the steps of:
storing a file systems write data operation in the first temporary data store of one of the plurality of servers;
mirroring the file systems write data operation in the second temporary data store of another of the plurality of servers;
deleting the file systems write data operation from the second temporary data store of said another of the plurality of servers when it is determined that the file systems write data operation stored in the first temporary data store of said one of the plurality of servers was successfully written to the storage medium; and writing the mirrored file systems write data operation in the second temporary data store of said another of the plurality of servers to the storage medium when it is determined that the file systems write data operation was not successfully written to the storage medium from the first temporary data store of said one of the plurality of servers.

17. The method of claim 16, further comprising the step of:
   determining if the file systems write data operation is successfully written to the storage medium from the first temporary data store of said one of the plurality of servers.

18. The method of claim 17, wherein said mirroring is performed one of concurrent with, during, or following said storing of the file systems write data operation in the first temporary data store of said one of the plurality of servers.

19. The method of claim 16, further comprising the step of:
   sending a signal back to a source of the file system write data operation when it is determined that the file systems write data operation is successfully stored in the first temporary data store of said one of the plurality of servers and the mirrored file systems write data operation is stored in the second temporary data store of said another of said plurality of servers.

20. The method of claim 16, wherein said writing the mirrored file systems write data operation from the second temporary data store of said another of the plurality of servers to the storage medium is done in the case when at least one of:
   (a) it is determined that said one of the plurality of servers is not operational;
   (b) it is determined that an operating system of said one of the plurality of servers is not operational; or
   (c) it is determined that an operating system I/O of said one of the plurality of servers is not operational.

21. A system for writing file systems write data operations and recovering mirrored data operations when there is a failure of a cluster server in a clustered server/data storage system, comprising:
   a storage medium;
   a plurality of servers servicing the storage medium, each server including
      a temporary data store and
      a re-direct filter driver configured and arranged to transmit a copy of write data operations associated with the respective server and a signal indicative of successful and unsuccessful completion of the write data operations; and
   a communications link, the communications link being configured and arranged so as to communicatively interconnect the temporary data store of one of the plurality of servers to the re-direct filter driver of another of the plurality of servers and to communicatively interconnect the temporary data store of said another of the plurality of servers to the re-direct filter driver of said one of the plurality of servers so that mirroring of the write data operations to another of the plurality of servers and monitoring of a status of carrying out the write data operations occurs.

22. The system for writing file systems write data operations of claim 21, wherein said communications link comprises a first and second communications interconnection, the first communications interconnection being configured and arranged so as to communicatively interconnect the first temporary data store of one of the plurality of servers to the second temporary data store of another of the plurality of servers and the second communications interconnection being configured and arranged to communicatively interconnect the first temporary data store of said another of the plurality of servers to the second temporary data store of said one of the plurality of servers.

23. The system for writing file systems write data operations of claim 22, wherein said first and second communications interconnects are each one of a fiber optical channel, a gigabit Ethernet and an infiniband.

24. The system for writing file systems write data operations of claim 21, wherein each server further includes a central processing unit and a program for execution on the central processing unit, said program including instructions and criteria for:
   storing a file systems write data operation in the first temporary data store of said one of the plurality of servers; and
   communicating a copy of the file systems write data operation being stored in the first temporary data store of said one of the plurality of servers via the communications link to the second temporary data store of said another of the plurality of servers for storage of the copy therein.

25. The system for writing file systems write data operations of claim 24, wherein said program for execution on the central processing unit further includes instructions and criteria for:
   deleting the copy of the file systems write data operation from the second temporary data store of said another of the plurality of servers in the case when the file systems write data operation is successfully written from the first temporary data store of said one of the plurality of servers to the storage medium; and
   writing the copy of the file systems write data operation from the second temporary data store of said another of the plurality of the servers to the storage medium in the case when the file systems write data operation is not successfully written from the first temporary data store of said one of the plurality of servers.

26. The system for writing file systems write data operations of claim 25, wherein said program for execution on the central processing unit further includes instructions and criteria so that said communicating is performed one of concurrent with, during, or following said storing of the file systems write data operation to the first temporary data store of said one of the plurality of servers.

27. The system for writing file systems write data operations of claim 24, wherein said program for execution on the central processing unit further includes instructions and criteria for:
   sending a signal back to a source of the file system write data operation when it is determined that the file systems write data operation is successfully stored in the first temporary data store of said one of the plurality of servers and the copy of the file systems write data operation is stored in the second temporary data store of said another of said plurality of servers.

28. The system for writing file systems write data operations of claim 24, wherein said program for execution on the central processing unit further includes instructions and criteria for performing said writing the copy of the file systems write data operation from the second temporary data store of said another of the plurality of servers to the storage medium in the case when at least one of:
   (a) it is determined that said one of the plurality of servers is not operational;

(b) it is determined that an operating system of said one of the plurality of servers is not operational; or (c) it is determined that an operating system I/O of said one of the plurality of servers is not operational.

29. The system for writing file systems write data operations of claim 21, wherein:

file systems write data operations are sourced from one or more client computers of a computer network;

each of the plurality of servers includes a device that operably interconnects each of the plurality of servers to the computer network; and said program for execution on the central processing unit further includes instructions and criteria for receiving and processing each file systems write data operation being sourced from any one of the one or more client computers.

30. The system for writing file systems write data operations of claim 29, wherein said program for execution on the central processing unit further includes instructions and criteria for:

sending a signal back to said one of the one or more client computers sourcing a given file system write data operation when it is determined that the given file systems write data operation is successfully stored in the first temporary data store of said one of the plurality of servers and the copy of the given file systems write data operation is stored in the second temporary data store of said another of said plurality of servers.

31. A program for execution on a central processing unit of each server of a cluster of servers that service a storage medium, the cluster of servers for processing file systems write data operations to be written to the storage medium and wherein each server includes a first and a second temporary data store, said program comprising instructions and criteria for:

storing the file systems write data operation in the first temporary data store of one of the servers of the cluster;

mirroring the file systems write data operation being stored in the first temporary data store of said one of the servers of the cluster in the second temporary data store of another of the servers of the cluster;

deleting the mirrored file systems write data operation from the second temporary data store of said another of the servers of the cluster in the case when the file systems write data operation is successfully written from the first temporary data store of said one of servers of the cluster to the storage medium; and writing the mirrored file systems write data operation from the second temporary data store of said another of the servers of the cluster to the storage medium in the case when the file systems write data operation is not successfully written from the first temporary data store of said one of the servers of the cluster.

32. The program for execution on a central processing unit of each server of a cluster of servers of claim 31, wherein the program further includes instruction and criteria for:

monitoring an operational status of each of the servers of the cluster; and causing the writing of mirrored file systems write data operation from the second temporary data store of said another of the servers of the cluster to the storage medium, when it is determined from said monitoring that said one of the clusters of the server is not operational.

33. The program for execution on a central processing unit of each server of a cluster of servers of claim 31, wherein a plurality of mirrored file systems write data operations are stored in the second temporary data store of said another of the servers of the cluster and wherein said writing includes writing all of the plurality of mirrored file systems write data operations.

34. A method for writing file systems write data operations to a storage medium being serviced by a plurality of servers, comprising the steps of:

storing the file systems write data operation in the first temporary data store of one server;

mirroring the file systems write data operation being stored in the first temporary data store of said one server in the second temporary data store of another server;

monitoring the operational status of the each server; and writing the mirrored file systems write data operation from the second temporary data store of said another server to the storage medium in the case when said monitoring determines that said one server is not operational.

35. The method for writing file systems write data operations to a storage medium of claim 34, wherein a plurality of mirrored file systems write data operations are stored in the second temporary data store and wherein said writing includes writing all of the plurality of mirrored file systems write data operations from the second temporary data store.

36. The method for writing file systems write data operations to a storage medium of claim 35, wherein said writing of all of the plurality of mirrored file system write data operations are completed before accepting any new file system write data operations for writing to the storage medium.

37. The method for writing file systems write data operations to a storage medium of claim 35, further comprising:

stopping said mirroring of file systems write data operations in the case when said one server is not operational; and restarting said mirroring of file systems write data operations in the case when said one server is returned to operation.

38. A method for writing file systems write data operations to a storage medium being serviced by a plurality of servers, each server including a first temporary data store and a second temporary data store, and wherein each server is configured and arranged so that one server has ownership over a first portion of the storage medium and another server has ownership of a second portion of the storage medium, said method comprising the steps of:

storing a given file systems write data operation in the first temporary data store of one of the plurality of servers, the server having ownership over that portion of the storage medium the given file systems write data operation is to be written to;

copying the given file systems write data operation being stored in the first temporary data store in the second temporary data store of the other of the plurality of servers, the server that does not have ownership over that portion of the storage medium the given file systems write data operation is to be written to;

deleting the copy of the given file systems write data operation from the second temporary data store when it is determined that the given file systems write data operation stored in the first temporary data store is successfully written to the storage medium; and writing the copy of the given file systems write data operation in the second temporary data store to the storage medium when it is determined that the given file systems write data operation was not successfully written to the storage medium from the first temporary data store.

39. The method for writing file systems write data operations to a storage medium of claim 38, further comprising the steps of:
monitoring the operational status of each of the plurality of servers;
determining which server is inoperable and a particular portion of the storage medium the inoperable server has ownership over;
assigning ownership of the particular portion of the storage medium to the operational server; and
causing the writing of the copy of the given file systems write data operation from the second temporary data store of the operational server to the particular portion of the storage medium.

40. The method for writing file systems write data operations to a storage medium of claim 39, wherein a plurality of given file systems write data operations are stored in the second temporary data store and wherein said writing includes writing all of the plurality of given file systems write data operations from the second temporary data store.

41. The method for writing file systems write data operations to a storage medium of claim 40, wherein said writing of all of the plurality of mirrored file system write data operations is accomplished before accepting any new file system write data operations for writing to the storage medium.

42. The method for writing file systems write data operations to a storage medium of claim 39, further comprising the steps of:
stopping said mirroring of file systems write data operations when an there is an inoperable server; and
restarting said mirroring of file systems write data operations when the inoperable server is returned to operation.

* * * * *